(12) United States Patent
Suorsa et al.

(10) Patent No.: US 9,356,504 B2
(45) Date of Patent: May 31, 2016

(54) POWER SUPPLY WITH INTERFERENCE SUPPRESSION, AND METHOD FOR OPERATING A POWER SUPPLY

(75) Inventors: Ilkka Suorsa, Espoo (FI); Jarmo Minkkinen, Pertteli (FI)

(73) Assignee: SALCOMP OYJ, Salo (FI)

( * ) Notice: Subject to any disclaimer, the term of this patent is extended or adjusted under 35 U.S.C. 154(b) by 0 days.

(21) Appl. No.: 13/985,484

(22) PCT Filed: Feb. 17, 2012

(86) PCT No.: PCT/FI2012/050158
§ 371 (c)(1),
(2), (4) Date: Aug. 14, 2013

(87) PCT Pub. No.: WO2012/110709
PCT Pub. Date: Aug. 23, 2012

(65) Prior Publication Data
US 2013/0322124 A1 Dec. 5, 2013

(30) Foreign Application Priority Data
Feb. 17, 2011 (FI) ...................................... 20115153

(51) Int. Cl.
*H02M 1/44* (2007.01)
*H02M 3/28* (2006.01)
(Continued)

(52) U.S. Cl.
CPC *H02M 1/44* (2013.01); *H02M 3/28* (2013.01); *H01F 27/40* (2013.01); *H01F 2027/065* (2013.01)

(58) Field of Classification Search
CPC . H02M 1/44; H02M 3/28; H02M 2001/0058; H02M 2001/342
USPC .................. 363/15–16, 21.01–21.18, 22–26, 363/95–98, 131–133
See application file for complete search history.

(56) References Cited

U.S. PATENT DOCUMENTS 5,694,302 A * 12/1997 Faulk ............................... 363/16
5,724,236 A * 3/1998 Oglesbee ........................ 363/40
(Continued)

FOREIGN PATENT DOCUMENTS

CN 1871761 A 11/2006
CN 101036284 A 9/2007
(Continued)

OTHER PUBLICATIONS

International Search Report (PCT/ISA/210) issued on Mar. 7, 2013, by the Finnish Patent Office as the International Searching Authority for International Application No. PCT/FI2012/050158.
(Continued)

*Primary Examiner* — Timothy J Dole
*Assistant Examiner* — Yusef Ahmed
(74) *Attorney, Agent, or Firm* — Buchanan Ingersoll & Rooney PC

(57) ABSTRACT

A switched-mode power supply is disclosed, which includes a transformer with a primary winding and a secondary winding. A switch is coupled in series with the primary winding and configured to repeatedly interrupt a current through the primary winding. An inductor is located differently with reference to magnetic fields that the primary and secondary windings are configured to induce. A connection exists between the inductor and a circuit that contains one of the primary and secondary windings. The connection is configured to connect from the inductor to the circuit a first voltage that has a waveform representative of and a polarity opposite to a second voltage induced in the switched-mode power supply by leakage flux of the transformer at a switching moment of the switch.

4 Claims, 4 Drawing Sheets

(51) Int. Cl.
*H01F 27/40* (2006.01)
*H01F 27/06* (2006.01)

(56) References Cited

U.S. PATENT DOCUMENTS

| | | | |
|---|---|---|---|
| 5,747,981 A | 5/1998 | Callanan | |
| 5,999,419 A * | 12/1999 | Marrero | 323/222 |
| 6,061,253 A * | 5/2000 | Igarashi et al. | 363/19 |
| 6,061,254 A * | 5/2000 | Takegami | 363/21.08 |
| 6,489,754 B2 * | 12/2002 | Blom | 323/222 |
| 7,142,440 B2 | 11/2006 | De Rooij et al. | |
| 7,529,105 B1 * | 5/2009 | Choi et al. | 363/21.12 |
| 7,548,028 B2 * | 6/2009 | Ushijima | 315/244 |
| 7,736,358 B2 * | 6/2010 | Shores et al. | 606/34 |
| 8,279,629 B2 * | 10/2012 | Nakahori et al. | 363/17 |
| 2002/0126509 A1 | 9/2002 | Liang | 363/16 |
| 2004/0032753 A1 * | 2/2004 | Liu et al. | 363/39 |
| 2005/0073863 A1 * | 4/2005 | de Rooij et al. | 363/39 |
| 2005/0073865 A1 * | 4/2005 | Steigerwald et al. | 363/47 |
| 2007/0159856 A1 * | 7/2007 | Yang | 363/21.12 |
| 2007/0274108 A1 * | 11/2007 | Jacques et al. | 363/21.12 |
| 2008/0037293 A1 * | 2/2008 | Jacques et al. | 363/21.03 |
| 2008/0084167 A1 * | 4/2008 | Waffenschmidt et al. | 315/210 |
| 2010/0321104 A1 * | 12/2010 | Busch | 327/552 |
| 2011/0101775 A1 * | 5/2011 | Busch | 307/18 |
| 2011/0188270 A1 * | 8/2011 | Schmid et al. | 363/21.12 |
| 2012/0063173 A1 * | 3/2012 | Fu et al. | 363/21.02 |
| 2012/0163056 A1 * | 6/2012 | Busch et al. | 363/128 |
| 2012/0177133 A1 * | 7/2012 | Oldenkamp | 375/257 |
| 2013/0265804 A1 * | 10/2013 | Fu et al. | 363/17 |
| 2013/0336011 A1 * | 12/2013 | Broussev et al. | 363/16 |

FOREIGN PATENT DOCUMENTS

| | | |
|---|---|---|
| EP | 0 100 098 A2 | 2/1984 |
| EP | 1 797 632 B1 | 8/2012 |

OTHER PUBLICATIONS

Written Opinion (PCT/ISA/237) issued on Mar. 7, 2013, by the Finnish Patent Office as the International Searching Authority for International Application No. PCT/FI2012/050158.
Finnish Search Report issued on Jan. 3, 2012.
Office Action issued May 6, 2015 by the Chinese Patent Office in corresponding Chinese Application No. 201280009467.1 (6 pages).

* cited by examiner

POWER SUPPLY WITH INTERFERENCE SUPPRESSION, AND METHOD FOR OPERATING A POWER SUPPLY

TECHNICAL FIELD

The invention concerns in general the technical field of switched-mode power supplies where a primary side and a secondary side are linked together through a transformer. Especially the invention concerns the suppression of electromagnetic interference in such switched-mode power supplies.

BACKGROUND

FIG. 1 illustrates the known principle of a flyback-type switched-mode power supply. The power supply comprises a primary side 101 and a secondary side 102, which are linked together through a transformer. An AC input to the primary side is rectified in a rectifier 103. A choke 104 and a capacitor 111 serve as a filter at the rectifier output. The primary current through a primary winding 105 of the transformer is regularly chopped with a switch 106 driven by an oscillator circuit 107. Intercepting the current in the primary winding 105 causes energy that was temporarily stored in the magnetic field of the transformer to discharge in the form of a current through the secondary winding 108 of the transformer. A diode 109 on the secondary side rectifies the secondary current and causes a secondary voltage to be maintained across a capacitor 110. The secondary voltage acts as the DC output voltage of the power supply.

The operation of a switched-mode power supply includes rapid changes in electric currents through inductive circuit elements, which in turn is a known source of electromagnetic interference (EMI). In order not to disturb the operation of other electric devices, and also in order to reduce the unnecessary loading of the components of the power supply itself, it would be advantageous to suppress the various sources of electromagnetic interference as much as possible. Two known and widely used approaches for EMI suppression involve the use of filter components in the power supply proper and its connections, and the use of conductive, shielding enclosures around power supplies and/or or their parts.

SUMMARY

Viewed from a first aspect, there can be provided a switched-mode power supply, comprising a transformer with a primary winding and a secondary winding, and a switch coupled in series with said primary winding and configured to repeatedly interrupt a current through said primary winding. The switched-mode power supply may comprise an inductor located differently with reference to magnetic fields that said primary and secondary windings are configured to induce, and a connection between said inductor and a circuit that contains one of said primary and secondary windings; wherein said connection is configured to connect from said inductor to said circuit a first voltage that has a waveform representative of and a polarity opposite to a second voltage induced in the switched-mode power supply by leakage flux of said transformer at a switching moment of said switch. Thereby effective suppression of common-mode electromagnetic interference may be achieved.

Viewed from another aspect, there can be provided a method for operating a switched-mode power supply, comprising repeatedly interrupting a current through a primary winding in a transformer. The method may comprise inducing a first voltage that has a waveform representative of and a polarity opposite to a second voltage induced by leakage flux of said transformer at a moment of interrupting said current, and connecting said first voltage to a circuit that contains one winding of said transformer. Thereby a reduction in a level of common-mode electromagnetic interference in said switched-mode power supply may be achieved.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF INTRODUCTION TO THE DRAWINGS

Figure 5:
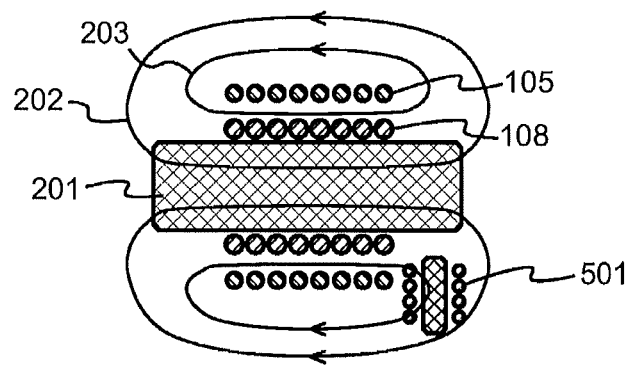
Figure 6:
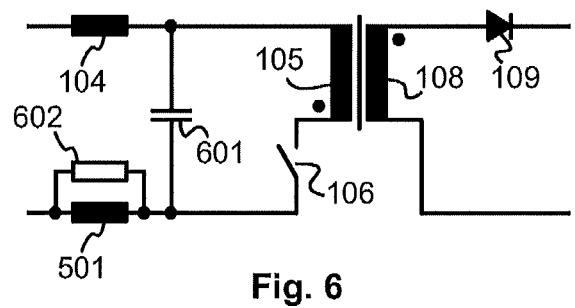
Figure 7:
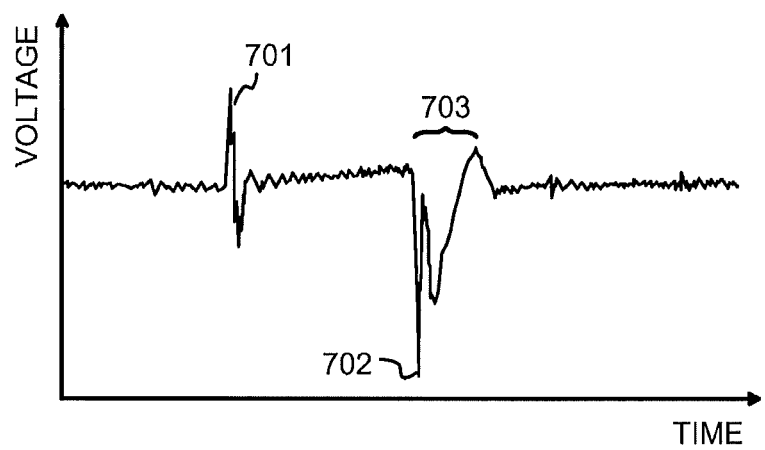
Figure 8:
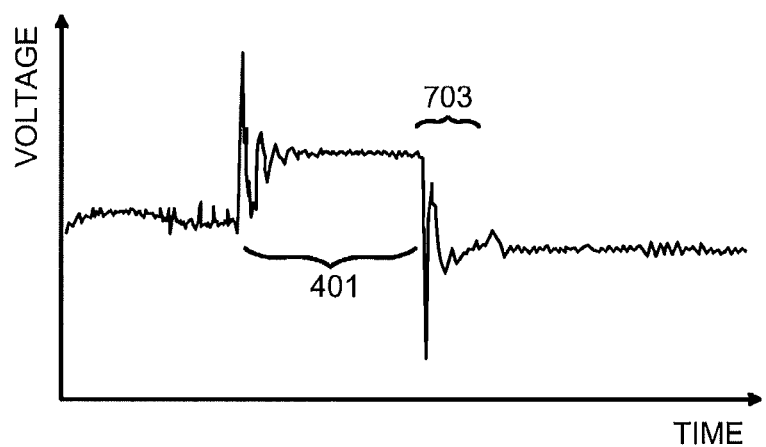
Figure 9:
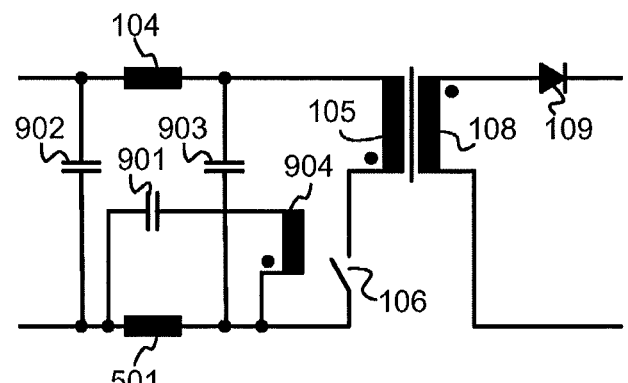
Figure 10:
Figure 11:
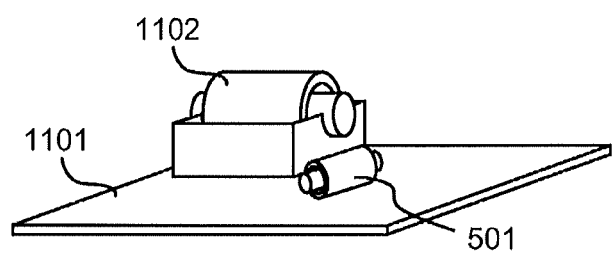

FIG. 5 illustrates an example inductor located in the vicinity of a transformer, FIG. 6 illustrates an example switched-mode power supply, FIG. 7 illustrates a measured voltage across an example inductor, FIG. 8 illustrates a measured common-mode voltage in an example case, FIG. 9 illustrates an example switched-mode power supply, FIG. 10 illustrates a measured common-mode voltage in an example case, and FIG. 11 illustrates an example switched-mode power supply.

DESCRIPTION

Examples of switched-mode power supplies and methods will now be described with reference to FIGS. 2 to 11.

Embodiments of the present invention are related to common-mode interference. According to a finding, common-mode interference is in many cases related with a voltage induced in a part of a switched-mode power supply by leakage flux in the transformer. The concepts of leakage flux and its effects are therefore briefly discussed.

Figure 1:
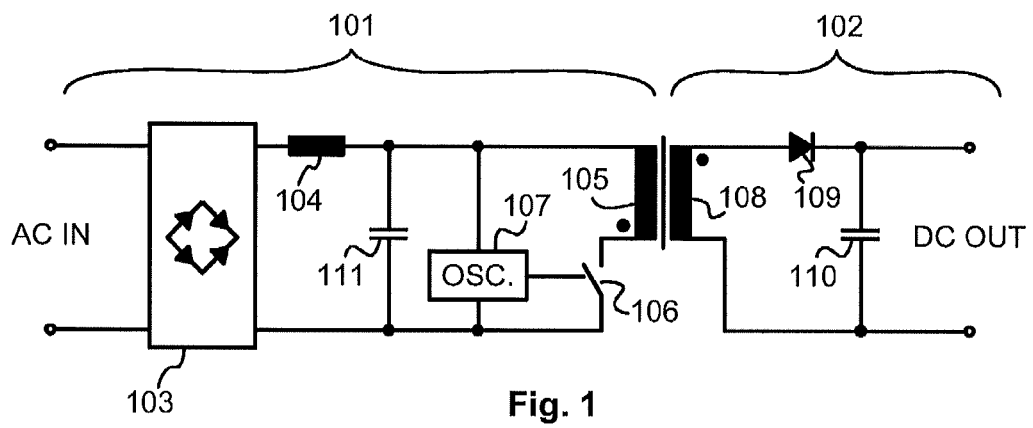
FIG. 1 illustrates an example switched-mode power supply.
Figure 2:
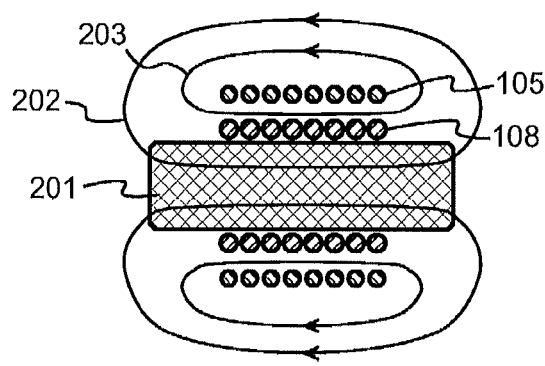
FIG. 2 illustrates an example transformer.

FIG. 2 illustrates the cross section of an example transformer. In this example the primary 105 and secondary 108 windings have been wound as cylindrical windings concentrically around a rod-shaped portion of a transformer core 201, with the secondary winding closer to the core. Alternatively, the primary winding could have been wound closer to the core. An electric insulator layer and possible auxiliary coil(s) separate the windings, but they have been omitted in the drawing for reasons of graphical clarity.

In order to implement the energy transfer from the primary side to the secondary side as efficiently as possible, the primary and secondary windings should be magnetically as closely linked to each other as possible. If the magnetic field of the windings is illustrated with magnetic flux lines, as many of them as possible should encircle the cross section of the conductors of both windings. However, in practical transformers some magnetic flux of one winding will always remain uncoupled to the other winding. In FIG. 2 flux line 202 is common to both windings, but flux line 203 illustrates magnetic flux of the primary winding 105 that is not coupled to the secondary winding 108. Such magnetic flux is called leakage flux and it gives rise to a phenomenon called the leakage inductance.

Leakage flux is not only a property of the outer winding in a transformer configuration like that of FIG. 2. It would be possible to draw a flux line encircling the cross section of the conductors of the secondary winding 108 so closely that it would not encircle the cross section of the conductors of the primary winding 105. Such flux lines would represent leakage flux associated with the inner (i.e. secondary) winding.

Figure 3:
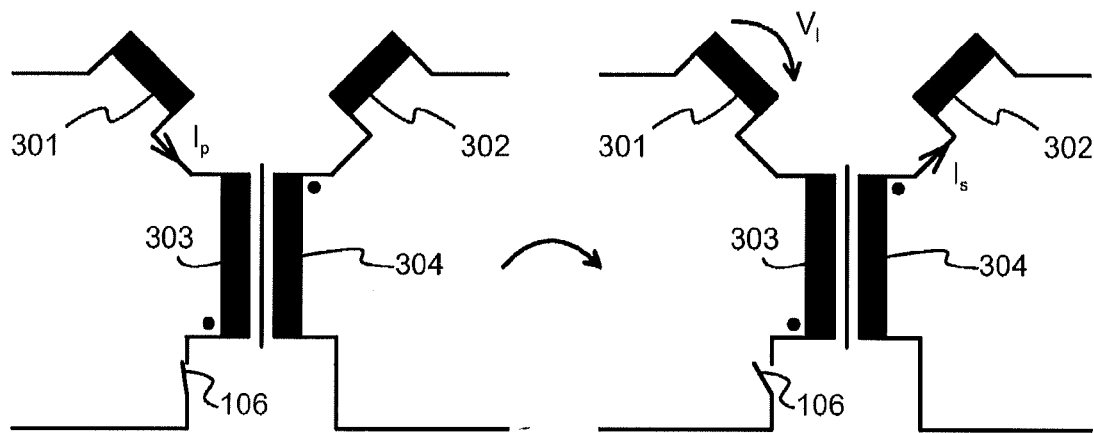
FIG. 3 illustrates the concept of leakage inductances.

During the operation of a switched mode power supply energy is repeatedly stored in and discharged from the leakage flux. In the example transformer of FIG. 2 the effect is the same as if there was a first free inductor coupled in series with the primary winding, and a second free inductor coupled in series with the secondary winding. FIG. 3 illustrates such fictitious serially coupled inductors 301 and 302. On the left side of FIG. 3 the switch 106 is closed, and a primary current $I_p$ runs through both the ideal representation 303 of the primary winding and the first fictitious serially coupled inductor 301. On the right side of FIG. 3 the switch 106 has just been opened. Interrupting the primary current causes most of the energy that was temporarily stored in the magnetic field to discharge to the secondary side in the form of a secondary current $I_s$, which runs through both the ideal representation 304 of the secondary winding and the second fictitious serially coupled inductor 302. However, for example the leakage flux that is conceptually associated with the first serially coupled inductor 301 induces a voltage $V_f$, the polarity of which is such that it tries to counteract the sudden decrease in the primary current. Since the magnitude of the induced voltage is proportional to the rate of change of the electric current, sudden switching of the primary current induces a relatively high voltage.

It should be underlined that the first and second serially coupled inductors 301 and 302 do not physically exist. They are just graphical representations of the concept of leakage inductance.

Figure 4:
FIG. 4 illustrates a measured common-mode voltage in an example case.

FIG. 4 illustrates schematically an example measured voltage between a primary winding and a secondary winding during a time around a switching pulse where the primary switch is first closed and then opened. This is the so-called common mode voltage, which illustrates in general a potential difference between the primary and secondary sides measured at the transformer. Normally the potential difference is essentially constant around a value C, which can be for example zero. However, during the switching pulse (i.e. during the time when the switch of the primary current remains conductive) there can be seen a certain pulse-formed potential difference, which in FIG. 4 appears during the time interval 401. At the switching moment at the end of the switching pulse, i.e. at the moment when the switch becomes non-conductive, the energy discharge from the leakage flux is initiated. During the time interval 402 a voltage waveform appears that is associated with the voltage induced by the energy discharging from the leakage flux.

High voltages in electrically conductive parts located close to each other cause capacitive coupling, which is the general name of energy transfers that take place through an electric field rather than a magnetic field. In particular, the relatively high voltages induced by the energy discharging from the leakage flux cause common-mode voltage over the transformer through capacitive coupling.

FIG. 5 illustrates an example arrangement where a transformer has a primary winding 105 and a secondary winding 108. We assume that the transformer of FIG. 5 is a part of a switched-mode power supply that comprises a switch (not shown in FIG. 5) coupled in series with the primary winding 105. Said switch is configured to repeatedly interrupt a current through the primary winding 105 according to the known principle utilized in switched-mode power supplies.

In addition to the transformer there is an inductor 501 that is located differently with reference to magnetic fields that said primary and secondary windings are configured to induce. Due to its location, the inductor 501 acts as a kind of sensor that measures the leakage flux. For example, if the inductor 501 is to measure the leakage flux associated with the primary winding 105, its location "differently with reference to magnetic fields that said primary and secondary windings are configured to induce" is most advantageously such that a larger portion of the magnetic flux of the primary winding than that of the secondary winding is coupled with the inductor 501.

Due to its location, the inductor 501 will experience an induced voltage waveform at the switching moment when the primary current is interrupted. Utilizing this induced voltage waveform to counteract the common-mode interference caused by the energy discharging from the leakage flux is possible, if there is a connection between the inductor 501 and a circuit that contains one of the primary and secondary windings. The connection is most advantageously such that said voltage waveform is representative of and has a polarity opposite to a second voltage induced in said switched-mode power supply by leakage flux of the transformer at said switching moment of the switch. In other words, the induced voltage waveform at the inductor 501 has preferably a polarity opposite to the waveform of the common-mode voltage over the transformer.

FIG. 6 illustrates a simplified example of certain parts of a switched-mode power supply. The primary current path comprises a circuit, the parts of which are a choke 104 that could also be called a bulk inductor or second inductor; the primary winding 105; and the switch 106. The inductor 501 is coupled to the switch 106.

Comparing to the more general description above, the "circuit that contains one of the primary and secondary windings" is here the primary current path, and the "connection between the inductor 501 and said circuit" is here the connection of the inductor 501 with the switch 106 of the primary current path. By selecting the polarity of the inductor appropriately, it can be ensured that the first voltage induced in the inductor 501 has the desired polarity, i.e. opposite to that of a second voltage induced in the switched-mode power supply by leakage flux of the transformer at said switching moment of the switch.

In the example switched-mode power supply of FIG. 6, the inductance of the choke 104 is higher (e.g. ten times) than the inductance of the inductor 501. The higher inductance in the choke 104 helps to maintain the waveform of the generated voltage similar to the waveform of the leakage flux generated voltage over the transformer.

Operating a switched-mode power supply like that of FIG. 6 comprises repeatedly interrupting a current through the primary winding 105 in the transformer. Since the inductor 501 is located differently with reference to magnetic fields that the primary and secondary windings are configured to induce, this causes inducing into the inductor 501 a first voltage that has a waveform representative of and a polarity opposite to a second voltage induced by leakage flux of said transformer at a moment of interrupting said current. The connections illustrated in FIG. 6 cause connecting said first voltage to a circuit that contains one winding of the transformer, which is here the primary winding.

The primary side of a switched-mode power supply may contain capacitors between the positive and negative rails of the primary current. In the example coupling of FIG. 6 a capacitor 601 is a part of the primary filtering arrangement, together with the choke or bulk inductor or second inductor 104. The inductor 501, which in practice has internal capacitance, might constitute an LC resonance circuit that could cause unwanted ringing. The resonance might also follow from other reactive elements in the system. If necessary, that can be avoided by coupling a resistor 602 in parallel with the inductor 501. The resistance value of the parallel resistor 602 should be selected high enough so that it does not effectively short-circuit the inductor 501. Namely, a too low parallel resistance across the inductor 501 would unnecessarily bleed out the voltage induced in the inductor 501, which would decrease its value in counteracting the EMI caused by the leakage inductance of the transformer.

FIG. 7 illustrates an example voltage measured across the inductor 501 in a switched-mode power supply that contains an arrangement like that of FIG. 6. The voltage spikes at locations 701 and 702 are believed to be the result of capacitive coupling between high-voltage parts of the switched-mode power supply and the inductor 501. Additionally or alternatively they may indicate common-mode currents through the inductor 501. However, during the time interval 703 there is clearly a voltage waveform that is representative of and has a polarity opposite to the second voltage that FIG. 4 shows to be induced between the primary and secondary windings by the leakage flux of the transformer.

FIG. 8 illustrates an example measured common-mode voltage in a switched-mode power supply that contains an arrangement like that of FIG. 6. The voltage graph of FIG. 8 is thus comparable to that of FIG. 4, with the difference that the voltage graph of FIG. 8 was measured in a switched-mode power supply that includes the common-mode interference suppression arrangement. During the time interval 401 there is again the pulse-formed potential difference, but immediately following it during the time interval 703 the leakage-flux-induced potential difference waveform that existed in FIG. 4 is now much less prominent.

The short transients that are visible in the voltage graph of FIG. 8 at the beginning and end of the switching pulse can be attenuated, if necessary. FIG. 9 illustrates a simplified example of certain parts of a switched-mode power supply where such attenuation is implemented.

In the switched-mode power supply of FIG. 9 the transformer has a primary winding 105 and a secondary winding 108. A switch 106 is coupled in series with said primary winding and configured to repeatedly interrupt a current through said primary winding. An inductor 501 is located differently with reference to magnetic fields that said primary and secondary windings are configured to induce, and there is a connection between said inductor 501 and a circuit that contains one of said primary and secondary windings; here especially the primary winding 105. Said connection is configured to connect from said inductor to said circuit a first voltage that has a waveform representative of and a polarity opposite to a second voltage induced in said switched-mode power supply by leakage flux of said transformer at a switching moment of said switch. The common-mode voltage generated by the inductor 501 is in series with the common-mode voltage over the transformer.

The transformer has an auxiliary winding 904 which has an opposite polarity to the capacitively coupling voltage. Commonly, the highest voltage is in the primary and this causes the strongest capacitive coupling. In this case the auxiliary winding 904 has an opposite polarity to the primary voltage. A series coupling of the auxiliary winding 904 and a capacitor 901 has been coupled in parallel with the inductor 501. By using a properly selected small capacitor 901 the effect of the capacitive coupling can be substantially negated. The high frequency spikes 701 and 702 can also follow due to some other reason than capacitive coupling. The described capacitive cancellation process can still be used, if the frequency content of the pulses are opposite in phase. A relatively small capacitance value of the capacitor 901 is usually enough; in an example arrangement according to an embodiment of the invention a capacitance of 1 picofarad was used.

Similarly as in FIG. 6, the switched-mode power supply of FIG. 9 comprises a second inductor 104 (also known as the choke or the bulk inductor) coupled with the primary winding 105, the switch 106, and the inductor 501. In the series coupling of the second inductor 104, the primary winding 105, the switch 106, and the inductor 501, said second inductor 104 is located on the other side of the primary winding 105 and the switch 106 than the inductor 501. It is also possible to change the position of the inductors 104 and 501 between each other. Furthermore, it is possible to couple the second inductor 104 and/or the inductor 501 to the series connection of the primary winding 105 and the switch 106 through one or more electronic components. For example, a rectifier could be coupled between the second inductor 104 and the primary winding 105.

The switched-mode power supply may also comprise capacitors between the positive and negative rails of the primary current. In the example of FIG. 9 the switched-mode power supply comprises a capacitor 902 coupled in parallel with the series coupling of said second inductor 104, said primary winding 105, said switch 106, and said inductor 501. The switched-mode power supply of FIG. 9 comprises also a capacitor 903 coupled in parallel with a series coupling of said primary winding 105 and said switch 106 but not said inductor 501 or said second inductor 104.

FIG. 10 illustrates an example measured common-mode voltage in a switched-mode power supply that contains an arrangement like that of FIG. 9. The voltage graph of FIG. 10 is thus comparable to that of FIG. 8, with the difference that the voltage graph of FIG. 10 was measured in a switched-mode power supply that includes the capacitor 901 and the auxiliary winding 904 of FIG. 9. During the time interval 401 there is again the pulse-formed potential difference, but the short transients at its beginning and end are significantly smaller in amplitude than in FIG. 8.

A regular, pulsed common mode interference is relatively easy to suppress. Thus the voltage vs. time graph of FIGS. 8 and 10 can be made to approach the optimal form of a straight line at a constant voltage by including in the switched-mode power supply, in addition to the inductor 501 described so far, a pulsed common mode interferences suppression circuit for suppressing common mode interferences that take place at a longer time scale than the waveform mentioned earlier.

Placing the inductor 501 physically so that it is located differently with reference to magnetic fields that the primary and secondary windings are configured to induce can be done conveniently by selecting properly the installing locations of the transformer and the inductor on a circuit board. FIG. 11 illustrates schematically parts of an example switched-mode power supply that comprises a circuit board 1101 to which the transformer 1102 is attached. The inductor 501 is attached to said circuit board 1101 in the vicinity of the transformer 1102. A suitable location for the inductor 501, where it can properly sense the magnetic flux related to the leakage inductance, can be found e.g. by experimenting.

As an alternative, the inductor the task of which is to sense the magnetic flux related to the leakage inductance can be built as a part of the transformer. From the technology of transformers it is well known that several windings can be placed around a common core or otherwise within the common transformer structure in various ways. Again the most appropriate configuration, where the additional inductor can sense clearly enough the magnetic flux related to the leakage inductance, can be found e.g. by experimenting.

The examples presented in this description are only examples of the applicability of the invention and should not be construed limiting the scope of protection defined in the appended claims. For example, in all drawings such parts and components of the switched-mode power supply have been omitted that have little or no significance to the generation and suppression of common-mode electromagnetic interference. Also even if both drawings 5 and 11 appear to suggest that the longitudinal axes of the transformer windings should be at a right angle against the longitudinal axis of the additional inductor, this is just a choice related to graphical clarity and does not limit selecting the directions of the longitudinal axes differently. In many cases the windings are not even cylindrical, in which case it may become completely irrelevant to speak of any longitudinal axes or their directions.

An important class of alternative embodiments include switched-mode power supplies where the leakage-flux-sensing inductor is connected to the secondary winding and not to the primary as in the previously described embodiments. Since the common-mode voltage illustrated in FIGS. 4, 8, and 10 is a potential difference between the primary and secondary windings, it can be affected by affecting the potential of either the primary or the secondary winding, or even both. In connecting the leakage-flux-sensing inductor its proper polarity should be observed, because coupled in the incorrect way it would increase the leakage-flux-induced common-mode interference voltage rather than decrease it. However, since in its simplest form the inductor has only two ends, it is easy to test, if not otherwise known, which way the inductor should be connected in each case.

The invention claimed is:

1. A switched-mode power supply, comprising:
    a transformer with a primary winding and a secondary winding, and
    a switch coupled in series with said primary winding and configured to repeatedly interrupt a current through said primary winding, wherein the switched-mode power supply comprises:
        an inductor located differently with reference to magnetic fields that said primary and secondary windings are configured to induce;
        a connection between said inductor and a circuit that contains only one of said primary and secondary windings;
        a series coupling of an auxiliary winding and a capacitor, said series coupling being coupled in parallel with said inductor;
        a second inductor coupled in series with said primary winding, said switch, and said inductor;
        a first capacitor coupled in parallel with the series coupling of said second inductor, said primary winding, said switch, and said inductor; and
        a second capacitor coupled in parallel with a series coupling of said primary winding and said switch but not said inductor or said second inductor; and wherein said connection is configured to connect from said inductor to said circuit a first voltage that has a waveform representative of and a polarity opposite to a second voltage induced in said switched-mode power supply by leakage flux of said transformer at a switching moment of said switch.

2. The switched-mode power supply according to claim 1, wherein: the switched-mode power supply comprises a circuit board to which said transformer is attached, and said inductor is attached to said circuit board in the vicinity of said transformer.

3. A method for operating a switched-mode power supply, the switched-mode power supply including a transformer with a primary winding and a secondary winding, wherein the switched-mode power supply comprises:
    a series coupling of an auxiliary winding and a capacitor, said series coupling being coupled in parallel with said inductor;
    a second inductor coupled in series with said primary winding, said switch, and said inductor;
    a first capacitor coupled in parallel with the series coupling of said second inductor, said primary winding, said switch, and said inductor, and the switched-mode power supply comprises a second capacitor coupled in parallel with a series coupling of said primary winding and said switch but not said inductor or said second inductor, the method comprising:
    repeatedly interrupting a current through said primary winding in said transformer,
    inducing a first voltage that has a waveform representative of and a polarity opposite to a second voltage induced by leakage flux of said transformer at a moment of interrupting said current, and
    connecting said first voltage to a circuit that contains only one of said primary and secondary windings of said transformer.

4. The method according to claim 3, comprising:
    attenuating short transients in said first voltage with a series coupling of an auxiliary winding and a capacitor.

* * * * *